United States Patent
Badstue

(10) Patent No.: US 11,411,419 B2
(45) Date of Patent: Aug. 9, 2022

(54) WIRELESS CHARGING OF MULTIPLE RECHARGEABLE DEVICES

(71) Applicant: Oticon A/S, Smørum (DK)

(72) Inventor: Søren Christian Badstue, Smørum (DK)

(73) Assignee: Oticon A/S, Smørum (DK)

(*) Notice: Subject to any disclaimer, the term of this patent is extended or adjusted under 35 U.S.C. 154(b) by 142 days.

(21) Appl. No.: 16/554,393

(22) Filed: Aug. 28, 2019

(65) Prior Publication Data

US 2020/0076203 A1    Mar. 5, 2020

(30) Foreign Application Priority Data

Aug. 29, 2018  (EP) ..................................... 18191500

(51) Int. Cl.
| | |
|---|---|
| *H02J 7/00* | (2006.01) |
| *H02J 50/40* | (2016.01) |
| *H02J 7/02* | (2016.01) |
| *H04B 5/00* | (2006.01) |
| *H02J 50/10* | (2016.01) |

(52) U.S. Cl.
CPC .............. *H02J 7/007* (2013.01); *H02J 7/025* (2013.01); *H02J 50/10* (2016.02); *H02J 50/40* (2016.02); *H04B 5/0037* (2013.01); *H04B 5/0075* (2013.01)

(58) Field of Classification Search
CPC ....................................................... H02J 7/007
USPC ........................................................ 320/108
See application file for complete search history.

(56) References Cited

U.S. PATENT DOCUMENTS

| | | | |
|---|---|---|---|
| 2011/0148349 A1 | 6/2011 | Kim et al. | |
| 2011/0156640 A1* | 6/2011 | Moshfeghi | H02J 7/025 320/108 |
| 2012/0313445 A1 | 12/2012 | Park et al. | |

FOREIGN PATENT DOCUMENTS

| | | |
|---|---|---|
| EP | 2 546 956 A2 | 1/2013 |
| EP | 3 206 280 A1 | 8/2017 |
| WO | WO 2010/093973 A2 | 8/2010 |
| WO | WO 2010/093973 A3 | 8/2010 |

* cited by examiner

*Primary Examiner* — Eric D Lee
(74) *Attorney, Agent, or Firm* — Birch, Stewart, Kolasch & Birch, LLP

(57) ABSTRACT

There is presented a method for wirelessly charging, a plurality of rechargeable devices, wherein at least one rechargeable device is an ear level device, such as a hearing aid, said method including appointing a master device among the plurality of rechargeable devices, for each of the remaining rechargeable devices, transmitting information regarding a current battery status to the master device, such as wherein the step of transmitting information regarding battery status to the master device is carried out via a first communication channel, determining a charging profile of one or more rechargeable devices based on the plurality of information regarding current battery status, charging the one or more rechargeable devices based on, such as according to, the charging profile, such as wherein communication between the master device and a charger is carried out via a second communication channel such as a wireless communication channel, such as Bluetooth® or Bluetooth Low Energy or proprietary protocol).

12 Claims, 5 Drawing Sheets

WIRELESS CHARGING OF MULTIPLE RECHARGEABLE DEVICES

FIELD

The present disclosure relates to charging of an ear level device. More particularly, the disclosure relates to a method for wirelessly charging a plurality of rechargeable devices, wherein at least one rechargeable device is an ear level device, such as a hearing aid, and the present disclosure furthermore relates to a corresponding plurality of rechargeable devices, a charger a system and a computer program product.

BACKGROUND

Some wireless charging standards (like Qi) is able to charge only one unit (Power Receiving Unit (PRU)) at the time. This is because of the way the charger (Power Transmitting Unit (PTU)) communicates with the PRU. At the moment, it is necessary to place the units, one at the time, on the charger and wait until that is charged before removing that and place the next unit. As an alternative it is necessary to use multiple chargers, which is not always possible, e.g. when the charger is placed in the table at a restaurant or café.

Therefore, there is a need to provide a solution that enables improved charging.

SUMMARY

According to a first aspect, there is provided a method for wirelessly charging a plurality of rechargeable devices, wherein at least one rechargeable device is an ear level device, such as a hearing aid, said method including:
- Appointing a master device among the plurality of rechargeable devices,
- For each of the remaining rechargeable devices, transmitting information regarding a current battery status to the master device,
- Determining a charging profile of one or more rechargeable devices based on the plurality of information regarding current battery status,
- Charging the one or more rechargeable devices based on, such as according to, the charging profile.

The charging profile may be transmitted to the charger prior to or during the charging process, i.e. during the charging the one or more rechargeable devices.

A possible advantage is that it enables taking into account current battery status for a plurality of device into account and determining an (improved or optimal) charging profile based thereon, which may in turn enable that a better or optimal way of charging may be carried out, e.g., as opposed to simply charging one a device at a time to a maximum battery level. The charging profile may include a subselection of the plurality of devices to be charged, as some devices may have sufficient charge level or are left out of the charging for other reasons. Another possible advantage provided by the present description is that it enables utilizing a master device as a central processing unit or a junction (such as a junction for communication with a charger) enabling combining all current battery status information at one point, which in turn enables overcoming a possible problem that none or only one communication channel is available. In general, the present description may be particularly advantageous when the wireless charger only allows communication with one (rechargeable) device.

As an example: When a user has multiple units that are part of the same system (like hearing instruments), it is necessary to have all the units recharged, since they will be of little use if only some, e.g. one out of two, of the units is are working. The use time of the system is often defined by the unit with the smallest battery life left. The present disclosure further provides that the plurality of information regarding current battery status may be taken into account, and a charging profile of a plurality of devices is determined based thereon, which may for example optimize a remaining operating time (such as optimizing a remaining operating, time of the device with the minimum operating time after charging).

As a further example, a system where a charger is to charge two, or more, hearing devices, the two or more hearing devices may communicate between them to establish which device has the lowest battery level, and this device may be selected to be the first device to be charged for a period of time. This information is then sent to the charger, which then charge the master device, i.e. the device selected for being charged in this period. The two or more hearing devices may have decided which of them are to be charged next. A sequence may be established at the beginning of the charging process, or the sequence may be established, or at least modified, over the total charging period. It might be assumed that the hearing devices only have minimal power draw during the periods where they are not charged, and placed in/at the charger. The hearing aid or hearing aids may be brought into a charging state where the power consumption is low or at least predictable so that a schedule or scheme may be established so that the charge level, e.g. the level of a rechargeable battery in the device, of the individual devices are at least at approximately the same level, or at least same relative level and thus reach full charge level at approximately the same time. The devices may be charged according to relative levels so that the device which has the lowest relative level, e.g. the current charge level seen relative to the full capacity of the battery, is charged first. The full capacity may be the full initial capacity, or a current full capacity, which could be useful if the rechargeable battery capacity degrades over time.

If the system the rechargeable devices is a part of, includes a way for the rechargeable devices to communicate together wirelessly, this communication channel can be used for agreeing which rechargeable device is to communicate with the charger, i.e. which device is to be the master device. The rechargeable device selected among the plurality of rechargeable devices to communicate with the charger is denoted master device in the present context. The communication channel can also be used to agree, what to communicate to the charger.

This gives at least two possible ways of solving the problem:
a) The rechargeable devices in the system can hand over the right to communicate with and take power from the charger, e.g. hand over the role as master device, to each other. So when rechargeable device A has reached a certain battery level, it can hand over the charger to rechargeable device B and hereafter rechargeable device C, etc. When all rechargeable devices have reached the same battery level, they can start over again to reach the next battery level. In this way, all rechargeable devices will have approximately the same battery level all the time, so the system does not have one rechargeable device with very little battery life left, defining the total system's life time. This option may be advantageous for being faster than option b referred to below.

b) The rechargeable devices in the system can agree on one rechargeable device to communicate with the charger. This rechargeable device takes care of all the communication to the charger, but receives information from the rest of the rechargeable devices through the system communication channel. In this way, the charger can charge all the rechargeable devices at the same time (however, this might be slower than in solution a referred to above). If one rechargeable device needs to communicate anything to the charger, this will go through the rechargeable device responsible for the communication. If the rechargeable device responsible for the communication is fully charged or for any other reason cannot communicate with the charger anymore, this responsibility is handed over to another rechargeable device.

This solution does not necessarily require all rechargeable devices to charge with the same power or to the same level. This can be agreed between the rechargeable devices dependent on, e.g., the current battery level, the battery size or the amount of power used in the individual rechargeable devices.

By the phrase 'charging the one or more rechargeable devices based on the charging profile' it may be understood that the charging may be at least partially influenced by the charging profile, such as the charging profile plays a role but another factor may also play a role (such as another input, e.g., a signal generally off-setting any non-zero charge rate with a constant factor). In the present description charging the one or more rechargeable devices is preferably done according to the charging profile, such as wherein the charging is exclusively dependent on the charging profile.

The 'plurality of rechargeable devices' include at least one 'ear level device'. Besides the at least one hearing aid, further devices may include one or more or all of Another ear level device, and/or A streaming device, and/or A general "auxiliary device" or "intermediate device", and/or A microphone (array).

A 'ear level device' may be any one of, e.g., a hearing aid, a headphone or an earbud.

By 'hearing aid' may generally be understood a hearing device adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. In general, a hearing device includes i) an input unit such as a microphone for receiving an acoustic signal from a user's surroundings and providing a corresponding input audio signal, and/or ii) a receiving unit for electronically receiving an input audio signal. The hearing device further includes a signal processing unit for processing the input audio signal and an output unit for providing an audible signal to the user in dependence on the processed audio signal. A 'hearing aid' may be understood as is common in the art, such as a hearing aid adapted to be worn entirely or partly in the pinna and/or in the ear canal of the user.

According to the present description, the hearing aid may be an in-the-ear hearing aid, such as the in-the-ear hearing aid is an 'In-the-Canal' hearing aid and/or a 'Completely-in-Canal' hearing aid and/or a Invisibly In Canal (IIC) hearing aid and/or a Completely In Canal (CIC) hearing aid. An 'in-the-ear' type hearing aid may be understood to encompass also an 'In-the-Canal' hearing aid and/or a 'Completely-in-Canal' hearing aid and/or a Invisibly In Canal (IIC) hearing aid and/or a Completely In Canal (CIC) hearing aid.

The 'charging profile' is understood as is common in the art, such as a function of charge rate (such as a charge current) or as a function of time. Alternatively, charge profile may be defined for another charge metric, such as cell voltage or %-charge delivered as a function of time. It is understood that the 'charging profile of one or more rechargeable devices' may be for a single device only or for a plurality of devices, such as for a plurality of device where multiple similar or different charging profiles are assigned to corresponding multiple rechargeable devices.

According to the description, there is presented a method step for wirelessly charging a plurality of rechargeable devices, wherein the step of transmitting information regarding battery status to the master device is carried out via a first communication channel (such as a wireless communication channel, such as an inductive link), and wherein communication between the master device and a charger is carried out via a second communication channel (such as a wireless communication channel, such as Bluetooth or Bluetooth Low Energy or a proprietary protocol). The first and second communication channels may have similar or different carriers, e.g., both be based on inductive coupling or high frequency (HF) radio frequency communication or one being based on inductive coupling and the other being based on high frequency (HF) radio frequency communication. Furthermore, different codings and/or different carrier frequencies and/or different timeslots/codings may be used in the protocols of the first and second communication channels (i.e., different with respect to each other). An 'inductive link' may be based on mutual inductive coupling between a pair of inductor coils, such as an inductor coil in a master device and another induction coil in another rechargeable device. An inductive link is described in EP3160162A1 which is hereby included by reference in entirety, and in particular paragraph [0050] is included by reference.

The present disclosure further provides a method step for wirelessly charging a plurality of rechargeable devices, wherein the determination of a charging profile of the one or more rechargeable devices based on the plurality of information regarding battery status may be carried out in the master device. Thus, the master device may comprise a processor arranged for determining the charging profile. An advantage of this may be that the plurality of information need not be sent out of the rechargeable devices, such as the master device, since only the charging profile needs to be transmitted (such as transmitted to the charger). Another advantage may be that the charger need not comprise a comprise a processor arranged for determining the charging profile.

The present disclosure further provides a method step for wirelessly charging a plurality of rechargeable devices, wherein the method further comprises for each of the rechargeable devices, transmitting information regarding battery status to the charger, and wherein the determination of a charging profile of the one or more rechargeable devices based on the plurality of information regarding battery status may be carried out in the charger. Thus, the charger may receive information regarding battery status, such as obtained from the master device (where the master device may serve as a junction for routing the information from all rechargeable device to the charger). The charger may comprise a processor arranged for determining the charging profile. An may be that none of the rechargeable devices needs to comprise a comprise a processor arranged for determining the charging profile.

The present disclosure further provides a method for wirelessly charging a plurality of rechargeable devices, wherein the method may further comprise for each of the rechargeable devices, transmitting information regarding battery status to a unit external to the charger and the rechargeable devices, and wherein the determination of a charging profile of the one or more rechargeable devices based on the plurality of information regarding battery status may be carried out in said unit. Thus, the unit may receive information regarding battery status, such as obtained from the master device (where the master device may serve as a junction for routing the information from all rechargeable device to the unit). The unit may comprise a processor arranged for determining the charging profile. An may be that none of the charger or the rechargeable devices needs to comprise a comprise a processor arranged for determining the charging profile.

The present disclosure further provides a method for wirelessly charging a plurality of rechargeable devices, wherein a battery metric, such as battery level or an estimated remaining battery time, is provided for each of the rechargeable devices based on the plurality of information regarding battery status, and wherein the rechargeable devices may be charged sequentially, such as individually and sequentially, in an order depending on their battery metric values, such as rechargeable devices with lowest battery metric being charged first or rechargeable devices with highest battery metric being charged first. By "lowest" may in this regard be understood lowest battery level or smallest amount of (estimated) remaining battery time.

By 'a battery metric, is provided for each of the rechargeable devices based on the plurality of information regarding battery status' may be understood that the battery metric is provided exclusively on the battery status, such as if the battery metric is battery level. Alternatively, the battery metric is provided on the battery status and additional information provided with the battery status (such as also sent from the rechargeable devices with the battery status) or predetermined (such as predetermined and stored in a database accessible for a processor calculating the battery metric). For example, if the battery metric is estimated remaining battery time, the additional information may comprise information regarding battery size and expected power consumption of the associated (to the battery) rechargeable device.

The present disclosure further provides a method for wirelessly charging a plurality of rechargeable devices, wherein each rechargeable device may in a first round be charged to a battery metric value being less than a maximum battery metric value, such as charged to 20% battery level, and in one or more further rounds further charged. A possible advantage of this, may be that it maximizes remaining (system) battery lifetime, even if the charging is aborted before completion. For example, if complete charging is understood to be charging to a 100% charge level for all rechargeable devices, then if charging is aborted when one out of five devices are at 100% charge level while the others are at 0%, then the system might not work (if at least one of the other four devices are essential for operation). However, all devices may be charged first to 20% level, and if the charging is aborted, then the system may still be operable for some time. If the charging is not aborted, then charging can proceed until all devices are charged to 100% charge level.

The present disclosure further provides a method for wirelessly charging a plurality of rechargeable devices, wherein the rechargeable devices may each be charged to a first specific battery metric value being less than the maximum battery metric value before charging each of the rechargeable devices to a second specific battery metric value being less than the maximum battery metric value and greater than the first specific battery metric value. A possible advantage of this, may be that it maximizes remaining, (system) battery lifetime, even if the charging is aborted before completion. For example, if complete charging is understood to be charging to a 100% charge level for all rechargeable devices, then if charging is aborted when one out of five devices are at 100% charge level while the others are at 0%, then the system might not work (if at least one of the other four devices are essential for operation). However, all devices may be charged first to a first specific battery metric value, and, if the charging is aborted, then the system may still be operable for some time. If the charging is not aborted, then charging can proceed until all devices are charged to the second specific battery metric value. Thus, at least two charging cycles are involved (charging to the first battery metric value and charging to the second specific battery value). Further charging cycles may be involved, such as a total of 3, 5, 10, 20, 50, 100, 1000 charging cycles. In general, the last charging cycle result in the battery metric value being substantially the maximum battery metric value, such as within 10%, such as within 5%, such as within 2%, such as within 1% of the maximum battery metric value, such as the battery metric value being the maximum battery metric value.

The present disclosure further provides a method for wirelessly charging a plurality of rechargeable devices, wherein subsequent to a determination that a rechargeable device is to be charged, the rechargeable device to be charged may then be appointed as master device. Accordingly, the role of the master device may be passed on to whichever device is being charged.

The present disclosure further provides a method for wirelessly charging a plurality of rechargeable devices, wherein during charging the plurality of rechargeable devices, the master device is being charged at one point in time and at another point in time another device may be charged. Accordingly, the master device remains the master device (such as even during charging of other devices). The role of the master device may, however, be passed on to another rechargeable device if a device acting as master device cannot continue with being a master device and/or is fully charged.

The present disclosure further provides a method for wirelessly charging a plurality of rechargeable devices, wherein it may happen that only one rechargeable device is being charged at a time.

The present disclosure further provides a method for wirelessly charging a plurality of rechargeable devices, wherein a plurality of rechargeable devices may be charged at a time.

According to a second aspect, there is presented a plurality of rechargeable devices, wherein at least one rechargeable device is an ear level device, such as a hearing aid, said plurality of rechargeable devices each having a processor being configured for Appointment of a master device among the plurality of rechargeable devices, For each of the remaining rechargeable devices, transmission of information regarding battery status to the master device, Determination of a charging profile of one or more rechargeable devices based on the plurality of information regarding battery status OR for each of the rechargeable devices, transmission of information regarding battery status to an associated charger.

This plurality of rechargeable devices may be arranged for carrying out the method, such as at least the role of the rechargeable devices, according to the first aspect.

The present disclosure further provides that the plurality of rechargeable devices may comprise a binaural system comprising two hearing aids. A 'binaural (hearing) system' is understood as is common in the art, such as a system comprising two hearing aids where the two hearing aids are adapted to cooperatively provide audible signals to both of the user's ears.

According to a third aspect, there is presented a charger, such as a charger with an induction coil for wireless charging, for charging a plurality of rechargeable devices, said charger being arranged for determination of a charging profile of one or more rechargeable devices based on a plurality of information regarding battery status of each of the one or more rechargeable devices OR receiving a charging profile of one or more rechargeable devices. This charger may be arranged for carrying out the method, such as at least the role of the charger, according to the first aspect.

According to a fourth aspect, there is presented a system comprising a plurality of rechargeable devices according to the second aspect and the charger according to the third aspect. An advantage of this system may be that it facilitates charging in an easy, simple and/or (yet) effective manner, such as allowing that the plurality of rechargeable are all placed at the charger, and then an optimal charging profile may be determined automatically and charging carried out based thereon or according to the charging profile. This system may be arranged for carrying out the method, such as at least the role of the rechargeable devices and the charger, according to the first aspect.

According to a fifth aspect, there is presented a computer program product comprising instructions which, when the program is executed by a processing unit, cause the processing unit to determine a charging profile of one or more rechargeable devices in a plurality of rechargeable devices based on a plurality of information regarding battery status for each of the rechargeable devices. This aspect of the disclosure may be particularly, but not exclusively, advantageous in that this aspect may be accomplished by a computer program product enabling a computer system to carry out the operations of the second aspect of the description when down- or uploaded into the computer system.

The features and/or technical details outlined above may be combined in any suitable ways.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the method, plurality of rechargeable devices, charger, system and computer program product are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Figure 1:
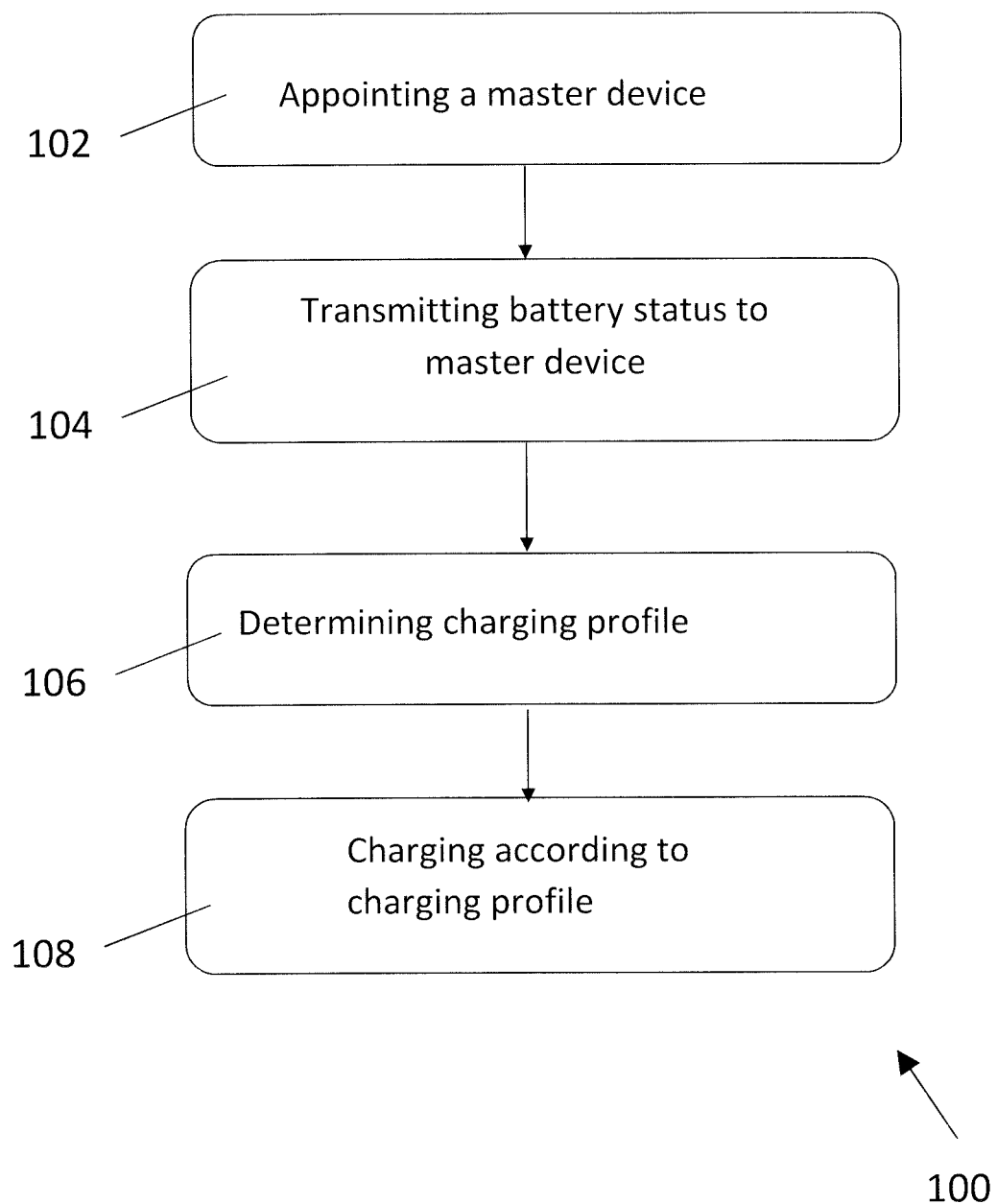
FIG. 1 illustrates steps of a method.

FIG. 1 illustrates a method, showing a method 100 for wirelessly charging a plurality of rechargeable devices 211, 212, 213, wherein at least one rechargeable device is an ear level device, such as a hearing aid, said method including:

Appointing 102 a master device among the plurality of rechargeable devices,
For each of the remaining rechargeable devices, transmitting 104 information regarding a current battery status to the master device,
Determining 106 a charging profile of one or more rechargeable devices based on the plurality of information regarding current battery status,
Charging 108 the one or more rechargeable devices based on, such as according to, the charging profile.

Figure 2:
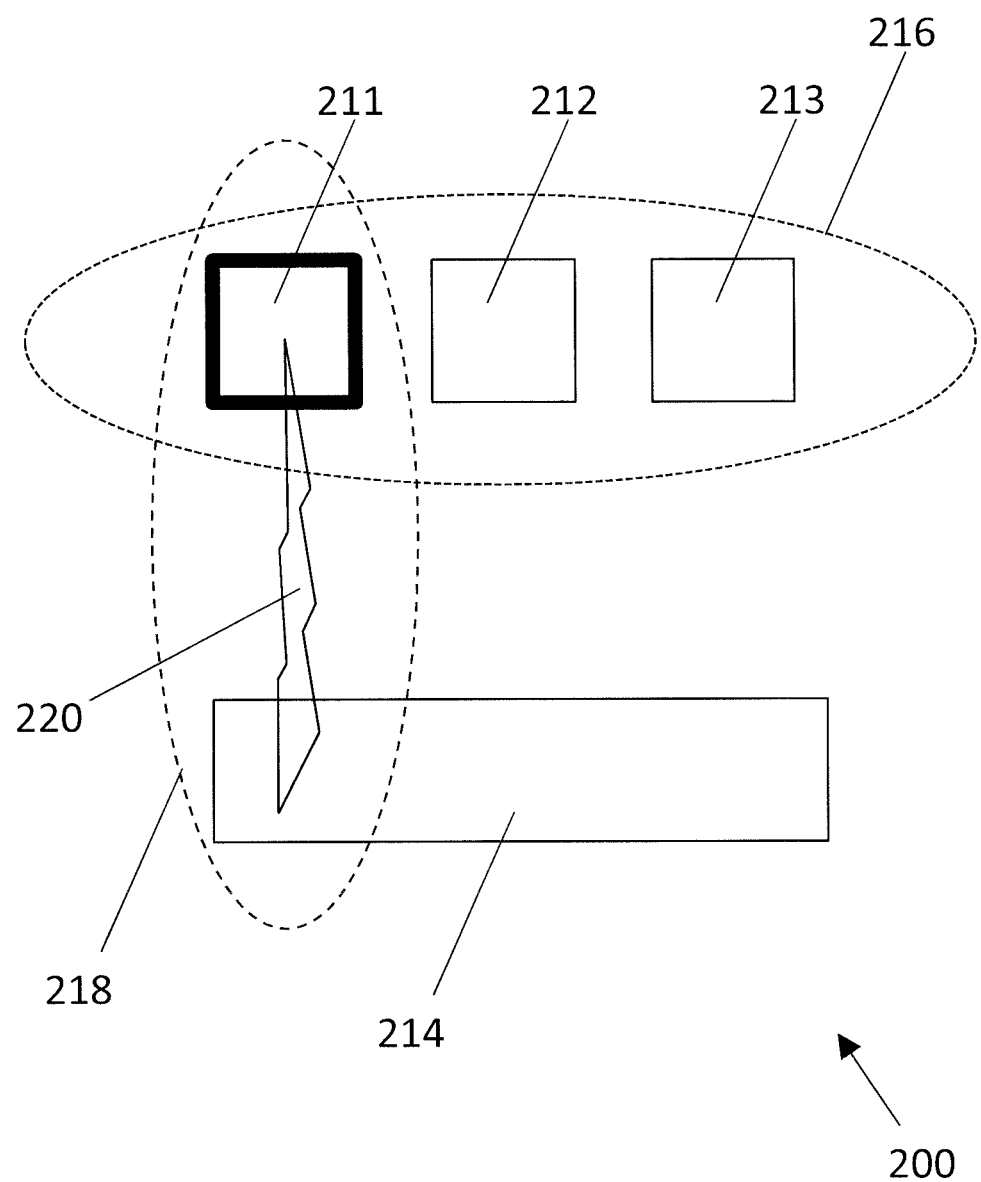
FIG. 2 shows a schematic of a system comprising a plurality of rechargeable devices.

FIG. 2 shows a schematic of a system 200 comprising a plurality of rechargeable devices 211, 212, 213 according to the second aspect and a charger 214 according to the third aspect. More particularly, the figure shows a plurality of rechargeable devices 211, 212, 213, wherein at least one rechargeable device is an ear level device, such as a hearing aid, said plurality of rechargeable devices each having a processor being configured for Appointment 102 of a master device 211 among the plurality of rechargeable devices,
For each of the remaining rechargeable devices, transmission 104 of information regarding battery status to the master device 211,
Determination 106 of a charging profile of one or more rechargeable devices based on the plurality of information regarding battery status OR for each of the rechargeable devices, transmission of information regarding battery status to an associated charger 214.

Furthermore, the figure shows a charger 214 for charging a plurality of rechargeable devices 211, 212, 213, said charger 214 being arranged for Determination 106 of a charging profile of one or more rechargeable devices based on a plurality of information regarding battery status of each of the one or more rechargeable devices OR receiving a charging profile of one or more rechargeable devices.

The step of transmitting 104 information regarding battery status to the master device 211 is carried out via a first communication channel 216, such as a wireless communication channel, such as an inductive link, and communication between the master device 211 and a charger 214 is carried out via a second communication channel 218 such as a wireless communication channel, such as Bluetooth® or Bluetooth Low Energy or proprietary protocol. The determination 106 of a charging profile of the one or more rechargeable devices based on the plurality of information regarding battery status is carried out in the master device 211 or in the charger 214.

In FIG. 2 it has been determined that the first rechargeable device 211 is to be charged (before second rechargeable device 212 and third rechargeable device 213) and subsequent to a determination that the first rechargeable device 211 is to be charged, the rechargeable device to be charged is appointed as master device (as indicated by the thick line defining the rectangle of the first rechargeable device 211). In FIG. 2, the first rechargeable device 211 is thus the master device, and (only) the first rechargeable device 211 is being charged (as indicated by the lightning 220).

Figure 3:
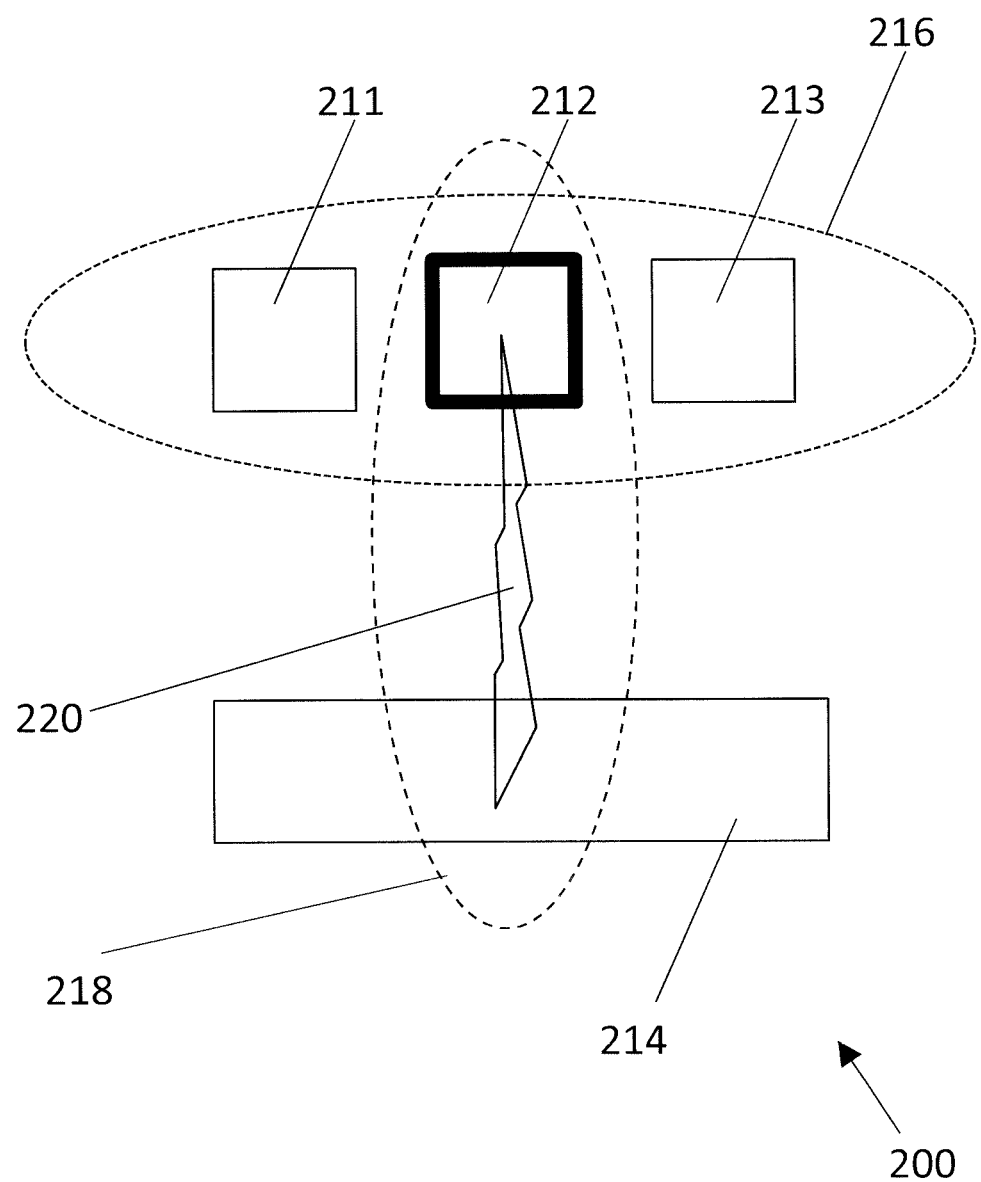
FIG. 3 shows the system 200 of FIG. 2 during a subsequent step.

FIG. 3 shows the system 200 of FIG. 2 during a subsequent step, wherein the first rechargeable device 211 has been charged, such as completely charged or charged to a first specific battery metric value being less than the maximum battery metric, and another rechargeable device, such as the second rechargeable device 212 is up for charging as indicated by the lightning 220. Accordingly, subsequent to the determination that the second rechargeable device 212 is to be charged, the second rechargeable device 212 to be charged is appointed as master device (as indicated by the thick line defining the rectangle of the second rechargeable device 212). This means that the master device is changed to a new rechargeable device, returning the old master device to be a regular member of the rechargeable device group. The role as master device change between the plurality of rechargeable devices. The change of role as master device from one device to another may be according to a schedule. Such a schedule may be established when the charging profiles are investigated Thus, the same rechargeable device that is being charged is also the master device.

Figure 4:
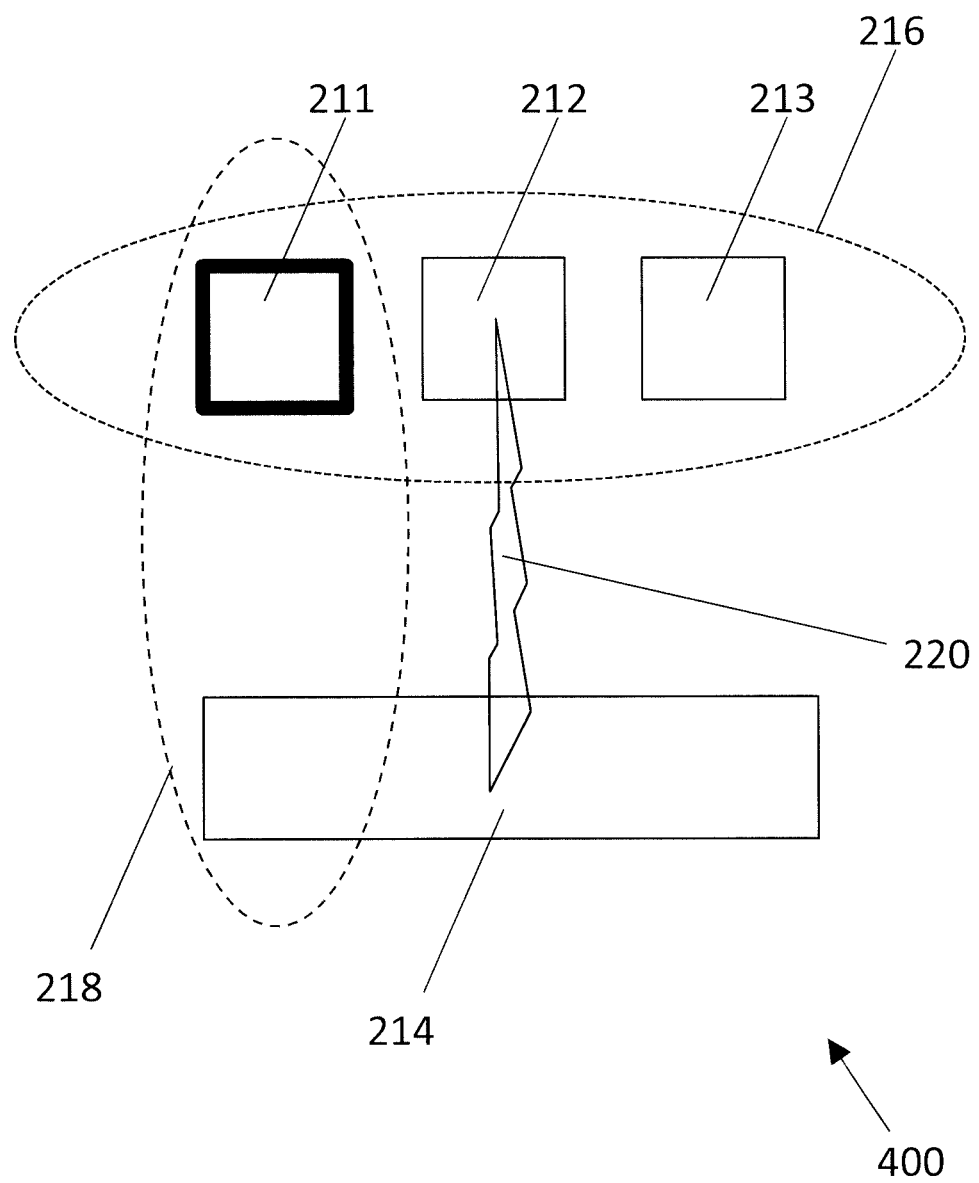
FIG. 4 shows a system 400.

FIG. 4 shows an alternative system 400 during a subsequent step (where the system 400 may be as depicted in FIG. 2 during a prior step), wherein the first rechargeable device 211 has been charged, such as completely charged or charged to a first specific battery metric value being less than the maximum battery metric, and another rechargeable device, such as the second rechargeable device 212 is up for charging as indicated by the lightning 220. Here, subsequent to the determination that the second rechargeable device 212 is to be charged, the first rechargeable device 211 remains master device (as indicated by the thick line defining the rectangle of the first rechargeable device 211). Thus, here, the master device is being charged at one point in time (as depicted in FIG. 2) and at another point in time another device is being charged (as depicted in FIG. 4).

Depicted in each of FIGS. 2-4 only one rechargeable device is being charged at a time.

Figure 5:
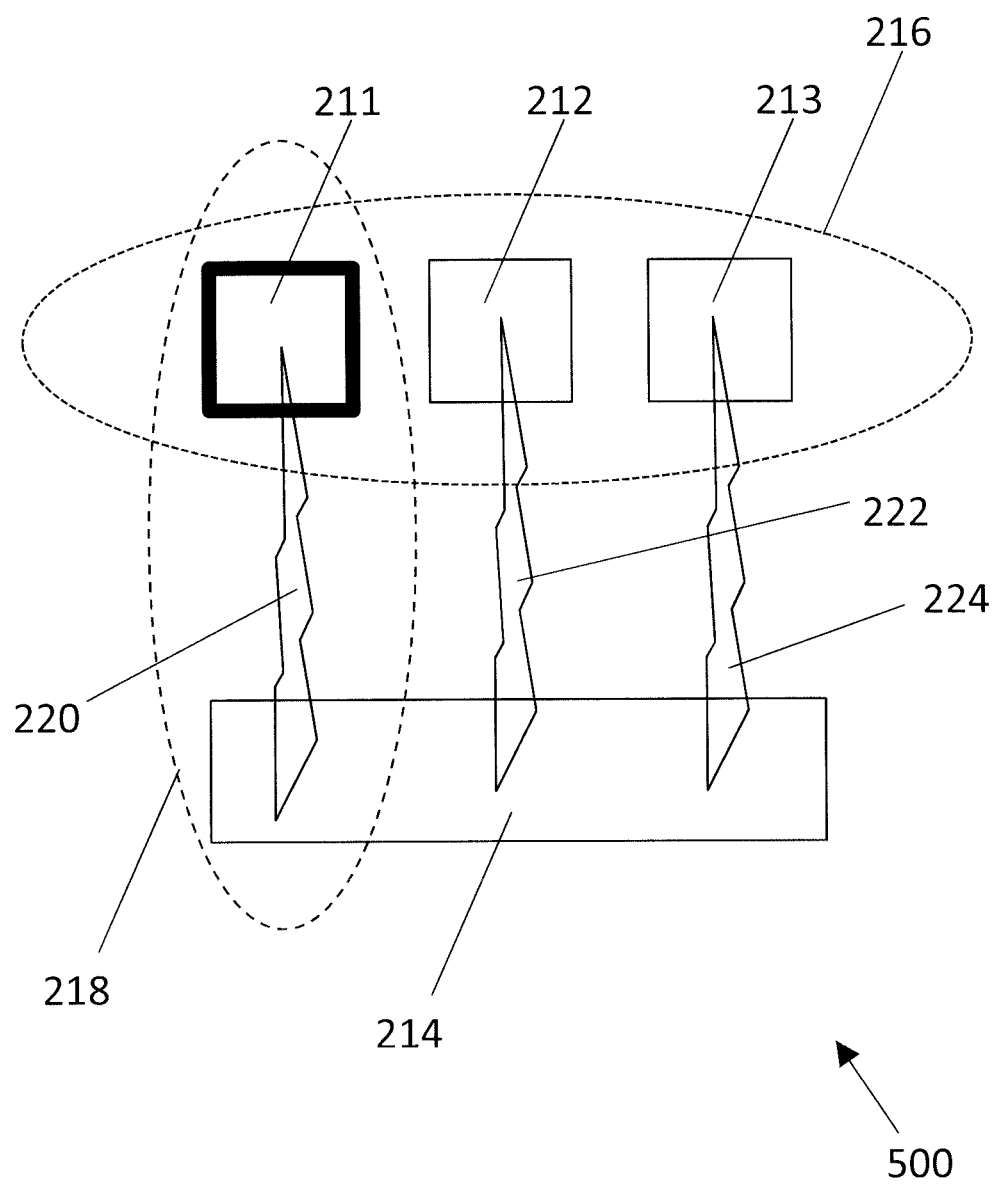
FIG. 5 shows a system 500.

FIG. 5 shows a system 500, wherein a plurality of rechargeable devices are being charged at a time (as indicated by the three lightnings 220, 222 224).

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening elements may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

The invention claimed is:

1. A method performed by a binaural hearing aid system, which includes rechargeable first and second hearing aid devices, for wirelessly charging the first and second hearing aid devices via a charger, said method including:

appointing a master device among the first and second hearing aid devices, the master device being configured to communicate with the charger, determining, via communications between the first and second hearing aid devices, the one of the first and second hearing aid devices that has a lower battery charge level, causing the charger to perform a first charge operation of charging the determined one of the first and second hearing aid devices to a first battery charge level, and then switch to performing a second charge operation of charging the other one of the first and second hearing aid devices to a second battery charge level, said first battery charge level being less than a full battery charge level for the determined hearing aid device, wherein the method is performed according to either of the following:

one of the first and second hearing aid devices is maintained as the master device until both the first and second hearing aid devices are charged to the full battery charge level, and the charger switches between the first and second charge operations based on a charging profile transmitted from the master device, or the determined one of the first and second hearing aid devices first takes the role as the master device in order to communicate an instruction to the charger to perform the first charge operation, and then hands over the role of the master device to the other one of the first and second hearing aid device, thereby causing the other one of the first and second hearing aid devices to issue an instruction to the charger to perform the second charge operation.

2. The method according to claim 1, wherein communications between the first and second hearing aid devices regarding their respective battery statuses to the master device is carried out via a first communication channel, and wherein communications between the master device and the charger is carried out via a second communication channel.

3. The method according to claim 2, wherein the first communication channel is a wireless communication channel or an inductive link.

4. The method according to claim 2, wherein the second communication channel is a wireless communication channel.

5. The method according to claim 4, wherein the wireless communication channel is any of Bluetooth, Bluetooth Low or proprietary protocol.

6. The method according to claim 1, wherein the charger switches between the first and second charge operations based on the charging profile, and the determination of the charging profile is carried out in the master device.

7. The method according to claim 1, wherein the method further comprises transmitting, by each of the first and second hearing aid devices, when taking the role of master device, information regarding battery status to the charger.

8. The method for wirelessly charging a plurality of rechargeable devices according to claim 1, wherein a plurality of rechargeable devices is being charged at a time.

9. A computer program product comprising instructions which, when the instructions are executed by a processing unit of at least one of the first and second hearing aid devices, performs the method according to claim 1.

10. The method according to claim 1, wherein the second battery charge level is less than full battery charge level, and multiple rounds of charging are performed for each of the first and second hearing aid devices to be charged to the full battery charge level.

11. A binaural hearing aid system comprising rechargeable first and second hearing devices to be wirelessly charged by a charger, at least one of the first and second hearing aid devices having a processor being configured for appointment of a master device among the first and second hearing aid devices, the master device being configured to communicate with the charger as necessary according to a battery status, determination, via communications between the first and second hearing aid devices, the one of the first and second hearing aid devices that has a lower battery charge level, instruction to the charger to perform a first charge operation of charging the determined one of the first and second hearing aid devices to a first battery charge level, and then switch to performing a second charge operation of charging the other one of the first and second hearing aid devices to a second battery charge level, said first battery charge level being less than a full battery charge level for the determined hearing aid device, wherein the processor is configured so that:

the appointed one of the first and second hearing aid devices is maintained as the master device until both the first and second hearing aid devices are charged to the full battery charge level, and the charger switches between the first and second charge operations based on a charging profile transmitted from the master device, or the determined one of the first and second hearing aid devices first takes the role as the master device in order to communicate an instruction to the charger to perform the first charge operation, and then hands over the role of the master device to the other one of the first and second hearing aid device, thereby causing the other one of the first and second hearing aid devices to issue an instruction to the charger to perform the second charge operation.

12. A binaural hearing aid system according to claim 11, further comprising the charger, wherein the processor of the one of the first and second hearing aid device appointed as the master device is configured for determination of the charging based on information of the battery charge level of each of the first and second hearing aid devices.

* * * * *